Patented Oct. 16, 1928.

1,687,803

UNITED STATES PATENT OFFICE.

WILLIAM B. STODDARD, OF STAMFORD, CONNECTICUT, AND VAMAN R. KOKATNUR, OF NEW YORK, N. Y., ASSIGNORS TO PILOT LABORATORY, INC., OF ARLINGTON, NEW JERSEY, A CORPORATION OF NEW JERSEY.

PROCESS OF AND COMPOSITION FOR BLEACHING.

No Drawing. Application filed March 8, 1927, Serial No. 173,784. Renewed December 29, 1927.

This invention relates to a process of and composition for bleaching animal and vegetable matter such as food stuffs, soaps, waxes and the like and in its preferred embodiment and most advantageous use is concerned particularly with a process of and agent for bleaching food stuffs normally containing chromophoric oil-bearing materials, e. g., flour, cottonseed and other seed meals, egg yolk, oils, fats and the like.

Organic peroxids heretofore have been used in the bleaching of food stuffs and particularly milling products and vegetable oils, benzoyl peroxid having been the only one extensively employed in such bleaching processes. Benzoyl peroxide, while regarded as being less harmful in bleaching food stuffs than most other peroxids, and materially less harmful than the cheap inorganic bleaching agents such as chlorine, nitrogen peroxid and the like, is expensive and belongs to a class of bodies whose use has beeen more or less restricted by the Federal food and drug act.
There has long been a demand for a bleaching process for food stuffs notably flour, seed meals and edible oils, which would be efficient, cheap, and not only entirely harmless but adapted to exert a beneficial action upon food materials bleached thereby, and we have long sought to provide a food bleaching process wherein the bleaching agent employed after finally completing its bleaching function, would leave a residue which is itself a recognized wholesome food material known to be incapable of deleteriously affecting the material treated by such process.

We have now discovered that many animal and vegetable materials, and particularly food stuffs such as flour, cottonseed and other seed meals, egg yolk, oils and fats can be readily, satisfactorily and very cheaply bleached by the action of a fatty acid peroxid, or a mixture of such peroxids, and that the bleached product after the final action of such peroxid or peroxids thereon, will contain as a residue from such fatty acid peroxids a food material (fatty acid or acids) which is, and is well known to be, a wholesome and beneficial addition to food stuffs. In accordance with our invention broadly considered, a suitable material, itself a food, is peroxidized. In the subsequent process of bleaching, it breaks up into oxygen and the food material originally peroxidized, whereby nothing remains in the bleached material except a wholesome food product which is a beneficial addition thereto.

We also have discovered that fatty acid peroxids, and to some extent the fatty acids produced therefrom in the bleaching operation, act as activators for other organic peroxids, thereby increasing their effectiveness as bleaching agents. Thus we have found that fatty acid peroxids will improve the bleaching action of other organic peroxids, and that the fatty acids which are produced in bleaching with fatty acid peroxids, or a mixture of such peroxids and other organic peroxids, act as activating catalysts not only for the unchanged fatty acid peroxids but for any other organic peroxid which may be employed therewith, whereby the rapidity and effectiveness of the bleaching is increased.

We may employ in our process any fatty acid peroxid, or mixture of such peroxids, however produced. We prefer, however, to employ mixed fatty acid peroxids produced from the fatty acid content of oils or fats, preferably produced from the fatty acid content of oils such, for example, as cocoanut or other inexpensive suitable oils.

Mixed fatty acid peroxids produced from the fatty acid content of a naturally occurring fat or oil, as for example, cocoanut oil, are not only less expensive than peroxids made from the individual fatty acids that are commercially available, e. g., oleic or stearic acid, but it is preferable to use mixed fatty acids from a source, such as cocoanut oil, which have a lower average molecular weight than that of the individual fatty acids commercially obtainable, and this we regard as an advantage in the production of peroxids from such fatty acids, because the lower the average molecular weight of the fatty acids peroxidized, the higher will be the percentage of active oxygen in the peroxids therefrom. We have found that peroxids of the higher fatty acids, commonly known as the soap forming fatty acids, are the most satisfactory for use in our process.

The following example illustrates the preferred process of producing our fatty acid peroxids, the preparation of the mixed organic chlorids being according to the process described in our application filed March 5, 1927, Serial No. 173,214, and the peroxidization of the resulting fatty acid chlorids being according to suitable peroxidation methods:

One average mole kilo of a mixture of suitable fatty acids obtained from a natural oil, such as cocoanut oil, depending upon the average molecular weight of the fatty acids, is placed in any suitable vessel fitted up with a thermometer and a delivery tube for gas. For example, if a mixture of two fatty acids $a$ and $b$ is to be used in which the molecular weight of acid $a$ is 160 and the molecular weight of acid $b$ is 180, then 170 kilograms of the mixture of acids $a$ and $b$ is used. To this is added slightly more than one mole kilo, i. e., 197 kilograms of benzo-trichlorid together with about .5 kilo of ferric chlorid. The mixture is heated on a water bath with or without agitation until the evolution of hydrochloric acid practically ceases. From the resulting mixture of benzoyl chlorid and fatty acid chlorids, compounds containing iron and a small amount of tar-like products, the mixture of fatty acid chlorids is separated by fractional distillation.

The mixture of fatty acid chlorids is further purified if desired and used for peroxidation.

Thus 760 litres of a 5 per cent solution of hydrogen-peroxid by weight or its equivalent in other strengths, are placed in a suitable vessel and 565 kilograms of sal soda or the equivalent amount of other alkali, are dissolved or suspended in the solution. To this solution are gradually added within 15 or 20 minutes, with vigorous agitation, 187 kilograms of a mixture of pure fatty acid chlorids of an average acid molecular weight of 170. The reaction is continued until the odor of acid chlorid vanishes. The resulting product is quickly separated, washed with water and dried either with or without the addition of a filler or diluent. The dried material is suitable for bleaching purposes.

In the process of peroxidation, particularly in the case of water resistant acid chlorids, we have found that the addition of mutual solvents, both for the hydrogen peroxid and acid chlorids, or of emulsifying agents such as soap, for the fatty acid chlorids, help materially in hastening the reaction, and causing it to take place at a lower temperature.

The fatty acid peroxid or peroxids, either with or without a diluent or filler of the kind commonly employed with organic peroxid bleaching agents, is intimately mixed with the material to be bleached in the manner and in equivalent proportions commonly employed in the case of bleaching by the use of organic peroxids, such as benzoyl peroxid, and the bleaching action takes place by simply allowing the mixture to stand at ordinary temperatures.

These fatty acid peroxids are relatively easy and safe to make and to handle. They are more readily soluble in oils than other organic peroxids, and hence are particularly well adapted not only for the bleaching of oils but for the bleaching of other materials whose coloring matter is contained in the oil constituent of such materials, e. g., flour, seed meals, egg yolk and the like. Furthermore, the fatty acid peroxids after they begin their bleaching action are self-activating since the fatty acids produced in such bleaching action act as activating catalysts for the remaining undecomposed peroxids.

As indicated earlier, the fatty acid peroxids when mixed with other organic peroxids, such as benzoyl peroxid, act as activators for the other organic peroxids. Such mixtures of peroxids are however, advantageously used in the bleaching of materials other than food stuffs, since the advantage of using a peroxidized food material which will leave in the food stuffs treated only the food material from which the peroxid was made, outweighs any advantage resulting from the use of a mixture of the peroxidized food material with other organic peroxids.

The proportion in which the fatty acid peroxids may most economically be added to the milling products, or other material to be bleached, in order to effect thorough bleaching, can readily be determined by test, but this matter of the proportion of the bleaching agent to be used is far less important in the case of fatty acid peroxids than in the case of other bleaching agents, particularly in treating food stuffs, since fatty acid peroxids are very inexpensive to produce, and any excess of such peroxids over that required for thorough bleaching is gradually wholly decomposed leaving no residue or deposit other than the fatty acids.

While we have described in detail the preferred practice of our invention it is to be understood that the procedure set forth may be varied and that our invention is not limited thereto except as set forth in the subjoined claims.

We claim:

1. The process of bleaching comprising subjecting the food material to be bleached to the action of a peroxidized acid occurring in natural fats and oils.

2. A process of bleaching comprising subjecting the material to be bleached to the action of a soap-forming fatty acid peroxid.

3. A process of bleaching comprising subjecting the material to be bleached to the action of an oil soluble fatty acid peroxid.

4. A process of bleaching comprising subjecting the material to be bleached to the action of mixed fatty acid peroxids.

5. The herein described process of bleaching which consists in intimately mixing with a food material to be bleached a peroxidized food material which material comprises a fatty acid adapted upon decomposition in the bleaching process to revert to the original food material whose peroxid was employed as the bleaching agent.

6. The herein described process of bleaching which consists in intimately mixing with a food material to be bleached a peroxidized fatty acid adapted upon being decomposed in the bleaching process to revert to the fatty acid whose peroxid was employed as the bleaching agent.

7. A process of bleaching comprising subjecting the material to be bleached to the action of a peroxidized organic food material, which material comprises a fatty acid and decomposing said peroxidized organic food material into oxygen and the organic material from which said peroxid was produced.

8. A bleaching agent comprising a soap forming fatty acid peroxid.

9. A bleaching agent comprising an oil soluble fatty acid peroxid.

10. A bleaching agent comprising a peroxid of an organic compound which organic compound comprises a fatty acid and is an activating catalyst for its own peroxid.

11. A bleaching agent particularly adapted for bleaching food stuffs by being intimately mixed therewith comprising a peroxidized food material which material comprises a fatty acid and which is adapted to be decomposed into oxygen and such food material during the bleaching operation.

12. A bleaching agent particularly adapted for bleaching food stuffs by being intimately mixed therewith comprising a peroxidized fatty acid adapted to be decomposed into oxygen and fatty acid during the bleaching operation.

In testimony whereof we affix our signatures.

WILLIAM B. STODDARD.
VAMAN R. KOKATNUR.